United States Patent
Hara et al.

(10) Patent No.: US 7,009,747 B2
(45) Date of Patent: Mar. 7, 2006

(54) MICRO-MIRROR AND A METHOD FOR FABRICATING THE SAME

(75) Inventors: Masaki Hara, Kanagawa (JP); Takuya Makino, Chiba (JP); Kazuhito Hori, Kanagawa (JP); Kazuhiro Hane, Miyagi (JP); Minoru Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 383 days.

(21) Appl. No.: 10/092,711

(22) Filed: Mar. 7, 2002

(65) Prior Publication Data

US 2002/0135033 A1 Sep. 26, 2002

(30) Foreign Application Priority Data

Mar. 8, 2001 (JP) .......................... P2001-065070

(51) Int. Cl.
*G02B 26/08* (2006.01)

(52) U.S. Cl. ..................... 359/224; 359/223; 359/838

(58) Field of Classification Search ........ 359/223–226, 359/290–291; 354/838
See application file for complete search history.

(56) References Cited

U.S. PATENT DOCUMENTS

| 5,910,856 | A * | 6/1999 | Ghosh et al. ................ 359/291 |
| 6,389,190 | B1 * | 5/2002 | Solgaard et al. .............. 385/18 |
| 6,456,420 | B1 * | 9/2002 | Goodwin-Johansson .... 359/291 |
| 6,587,612 | B1 * | 7/2003 | Mitchell et al. .............. 385/18 |
| 6,681,063 | B1 * | 1/2004 | Kane et al. ................... 385/18 |

* cited by examiner

*Primary Examiner*—Thong Nguyen
*Assistant Examiner*—Joshua L. Pritchett
(74) *Attorney, Agent, or Firm*—Sonnenschein, Nath & Rosenthal LLP

(57) ABSTRACT

A micro-mirror for deflecting an incident light is disclosed, wherein the micro-mirror comprises: a mirror section for reflecting an incident light issued from a laser diode; a hinge section including a fixed section and a movable section each having a flat surface; and a drive section having a bi-morph structure made of two or more of materials having different heat expansion coefficient for deflecting said mirror section to change relative angle to said incident light.

2 Claims, 9 Drawing Sheets

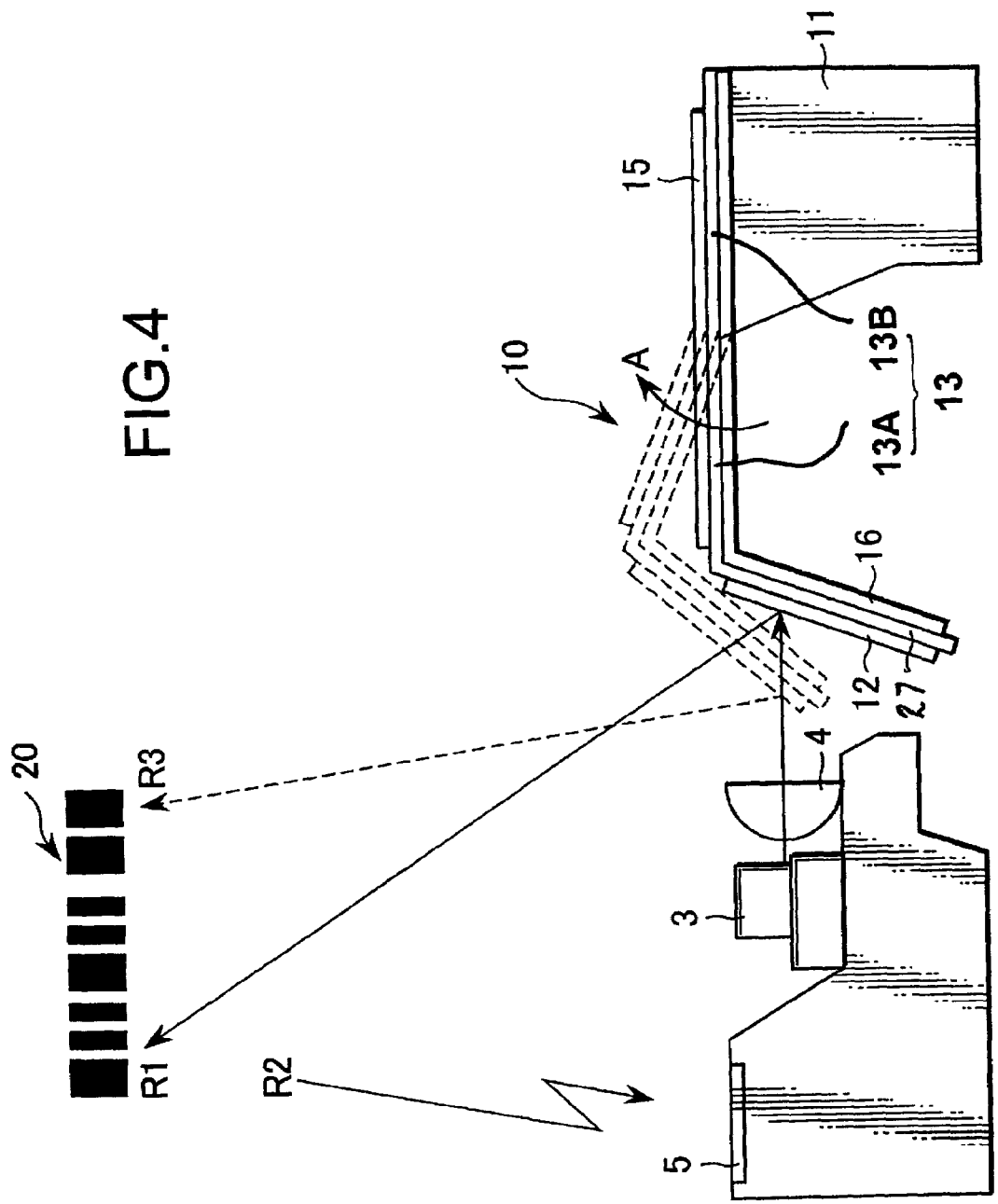

MICRO-MIRROR AND A METHOD FOR FABRICATING THE SAME

CROSS REFERENCE TO RELATED APPLICATIONS

This application claims priority from Japanese Priority Document No. 2001-065070, filed on Mar. 8, 2001 with the Japanese Patent Office, which document is hereby incorporated by reference.

BACKGROUND OF THE INVENTION

1. Field of the Invention

This invention relates to a micro-mirror applied to a MEMS (Micro Electro Mechanical Systems) and a method for fabricating such micro-mirror, and particularly this invention relates to a micro-mirror suitable for document scanning application and a method for fabricating the same.

2. Description of the Related Art

A micro-mirror (namely, a scanning mirror) is fabricated by a micro machining using a silicon substrate as a part applied to a laser scanner, for example. In a conventional micro-mirror such as described in an article [Technical Digest of the 16$^{th}$ Sensor Symposium, 1998 pp. 167–170], for example, a flat surface section of a silicon substrate is made to be a mirror surface in almost of all the micro-mirrors. In this case, on an upper substrate made of silicon, a micro-mirror and a hinge section for supporting the micro-mirror on the upper the substrate are fabricated by an-isotropic etching process, and the micro-mirror vibrates by an electro-static power acting between an electrode formed on a lower substrate and an electrode provided on the upper substrate in a direction perpendicular to the upper substrate with the hinge section as a center.

Incidentally, the conventional micro-mirror as described above has advantages such that a fabricating process is simple because of its simple construction. On the contrary, as the flat surface of the substrate is directly utilized, its deflection angle is limited to a certain limited extent, so that a scanning area or extent is restricted when used as a scanner. Conventionally, it is proposed to provide a slant surface on a substrate and a scanning mirror is set on the slant surface as a scanner (U.S. Pat. No. 5,966,230 or Japanese Laid-open Publication H7-199,103). In this article, the scanner is used as a bar-code reader, and in this case, the slant surface having an angle of 45 degrees relative to the flat section is at first formed on the substrate, and then the scanning mirror supported by an intolerance hinge section is provided at the slant surface, thereby the scanning mirror is made rotatable by an electro-static power with the intolerance hinge section as a center.

But in a particular application such as the bar-code reader, it is requested to be able to scan a target moving to all directions, to accept any shape of the target, to perform a high speed scanning of the target moving in a short time, etc. so that it is desired to enlarge the deflection angle of the micro-mirror. In the above-mentioned scanner, a deflecting direction of the scanning mirror is also substantially perpendicular to the top surface of the slant surface, and the rotation angle thereof is limited thereby.

Further in the conventional micro-mirror, the hinge section is fabricated by forming an aperture by etching, but generally, defects are frequently generated at corners of the aperture, so that if the aperture is formed only within a single surface (crystalline plane) as conventional, it causes a problem where the hinge section is tend to be destroyed by the concentration of the stress at the defect section upon driving. Further, there exists another problem where a dimensional accuracy of the hinge section is largely degraded by over-etching upon forming the aperture.

SUMMARY OF THE INVENTION

This invention is done to overcome the above-mentioned, and one aspect of the present invention is to propose a micro-mirror capable of performing high speed and wide scanning. Further it is another aspect of the present invention to propose a method for easily fabricating a micro-mirror capable of performing high speed and wide scanning by simple fabricating processes.

The micro-mirror of the present invention comprises a mirror section equipped with a reflecting film, and a drive means having a bi-morph structure utilized the difference of thermal expansion coefficient in at least two original materials, wherein the drive means changes the relative angles of the mirror section relative to the incident light. The drive means practically comprises a first drive film provided at one surface of the hinge section and a second drive film provided at another surface of the hinge section and the second drive film has larger thermal expansion coefficient than the first drive film. Both first drive film and the second drive film are conductive and may be made from different material to each other, and may have different conductivity to each other. For example, the first drive film is made from poly-crystal silicon including an impurity such as phosphor (P) and the second drive film is made from aluminum film.

In this micro-mirror, the movable section of the hinge section having the bi-morph structure deflects by supplying current to the first drive film, and thereby the incident light is deflected along with the change of relative angle of the mirror section to the incident light in accordance with the deflection of the movable section. As the mirror section is formed to be a cantilever beam structure that comprises the fixed section of the hinge section as a fixed end, and the mirror section as a free end, the mirror section as the free end can get larger deflection angle.

Further according to a method for fabricating a micro-mirror of the present invention, the fabrication process includes concrete processes for a micro-mirror that comprises: a mirror section for reflecting an incident light; a hinge section including a fixed section and a movable section each having a flat surface; and a drive means having a bi-morph structure made of two or more of materials of heat expansion coefficient for deflecting a relative angle of the mirror section to the incident light, wherein the hinge section and the mirror section are integrally constructed by a structured film formed on a semiconductor substrate by utilizing crystal an-isotropy of the semiconductor substrate. With these processes, the micro-mirror having a slant surface for the mirror section is easily fabricated.

According to the micro-mirror of the present invention, as the drive means of the mirror section having the reflective surface, the bi-morph structure utilizing the differences in thermal expansion coefficient of at least two materials are employed, so that it is possible to perform a high speed and wide angle deflection of the mirror section.

Particularly the micro-mirror of the present invention comprises: a hinge section including a fixed section and a movable section each having a flat surface; and a drive means having a bi-morph structure made of two or more of materials of heat coefficient for deflecting a relative angle of the mirror section to the incident light so that it becomes possible to deflect the mirror section more widely. Accordingly, it becomes possible to make a scanning area wider when applied to a laser scanner or the like.

Further, according to a method for fabricating the micro-mirror of the present invention, the mirror section and the hinge section are formed by utilizing crystal anisotropy of a semiconductor substrate, particularly a silicon substrate for example, so that the micro-mirror of this invention can be easily fabricated.

BRIEF DESCRIPTION OF THE DRAWINGS

In the accompanying drawings:

FIG. 4 is a side view for explaining operation of the micro-mirror in FIG. 1;

DETAILED DESCRIPTION OF THE PREFERRED EMBODIMENTS

Figure 1:
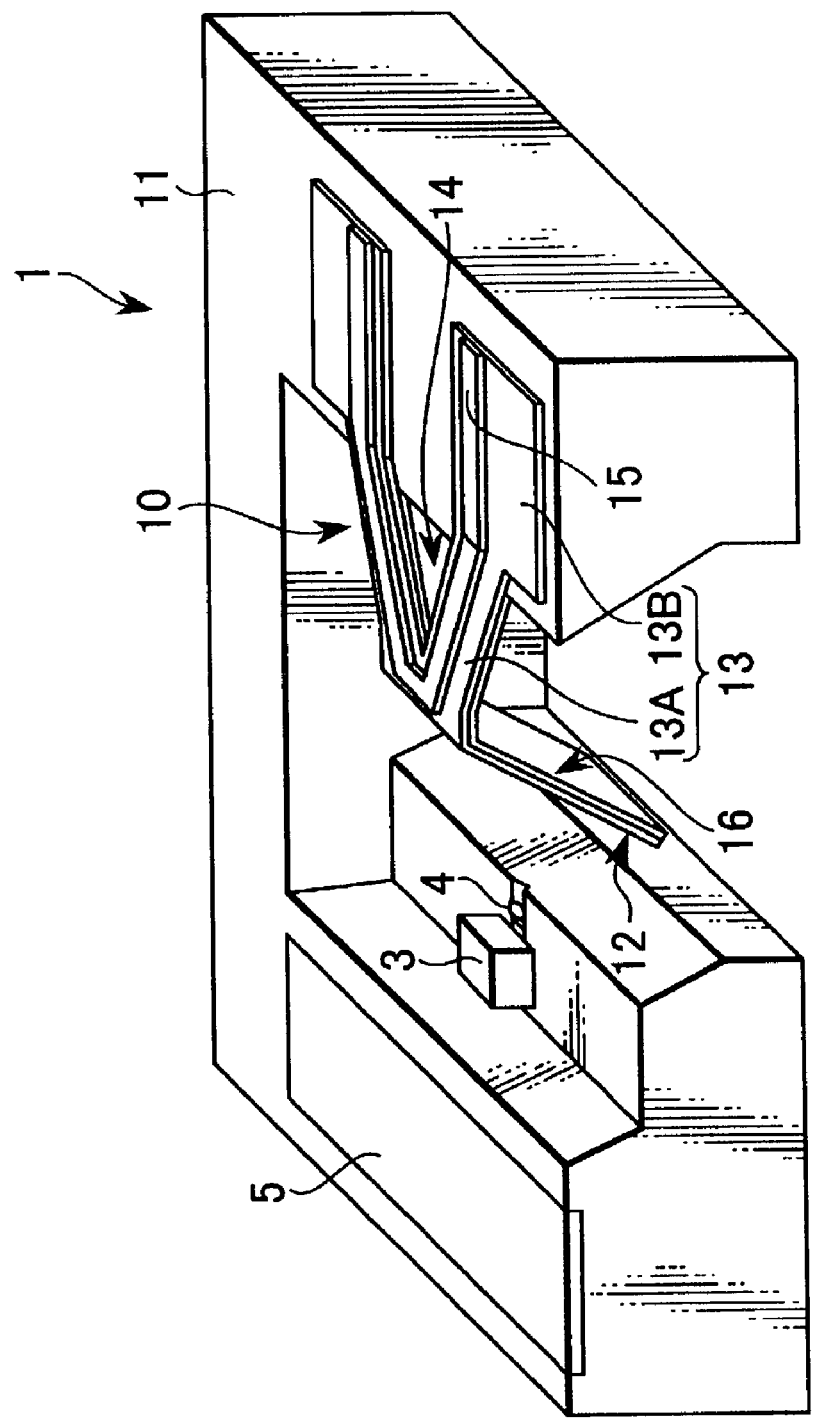
FIG. 1 is a perspective view for showing one embodiment of a scanner structure to which one embodiment of a micro-mirror of the present invention is applied.

Now, one of embodiments of the present invention will be explained with reference to the accompanying drawings. FIG. 1 shows a construction of a laser scanner (a bar-code scanner, for example) using a micro-mirror of the present invention, wherein a laser scanner 1 scans a bar-code with a laser beam irradiated from a laser diode 3 and converged at a micro-lens 4 by deflecting the laser beam with a micro-mirror 10, then, its reflected light (a return beam) is detected by a photo diode 5. These micro-mirror 10 and the photo diode 5 are fabricated using a common silicon substrate 11 as will be described later.

The micro-mirror 10 is opposite to the laser diode 3, and has a mirror section 12 having a slant surface and a flat-shaped hinge section 13 where the mirror section 12 side is a free end and the hinge section 13 side is a fixed end. For example, the hinge section 13 is formed to have a near V-shaped form for positioning a triangle aperture 14 in-between, and comprises a movable section 13A linking to the mirror section 12 and a fixed section 13B formed on a flat surface (100) of a silicon substrate 11 by extending the movable section 13A. Namely this micro-mirror 10 is constructed to be a cantilever boom structure where the mirror section 12 at a tip rotationally deflects around a boundary section between the fixed section 13B and the movable section 13A of the hinge section 13.

These mirror section 12 and the hinge section 13 are, as described later in the fabrication method, so formed that, at first, a silicon nitride film is formed, as a structured film, on a front surface of the silicon substrate 11 on which a slant surface (111) is formed by an-isotropic etching, then they are integrally fabricated by restoring the thin film of the silicon nitride by removing the silicon substrate 11 in an etching process.

The mirror section 12 is formed by utilizing the slant surface (111) obtained by performing an-isotropic etching to the silicon substrate 11. An angle formed by the flat surface (100) and the slant surface (111) of the silicon substrate 11 is 55 degrees, so that the mirror section 12 is slanted by about 55 degrees relative to the fixed section 13B of the hinge section 13. Accordingly, it becomes possible to obtain a wider angle formed by the mirror section 12 and the fixed section 13B. Incidentally, as shown in FIG. 2, a reflection film 12A made of an aluminum film, for example, having high reflection coefficient is provided at the mirror section 12.

Figure 2:
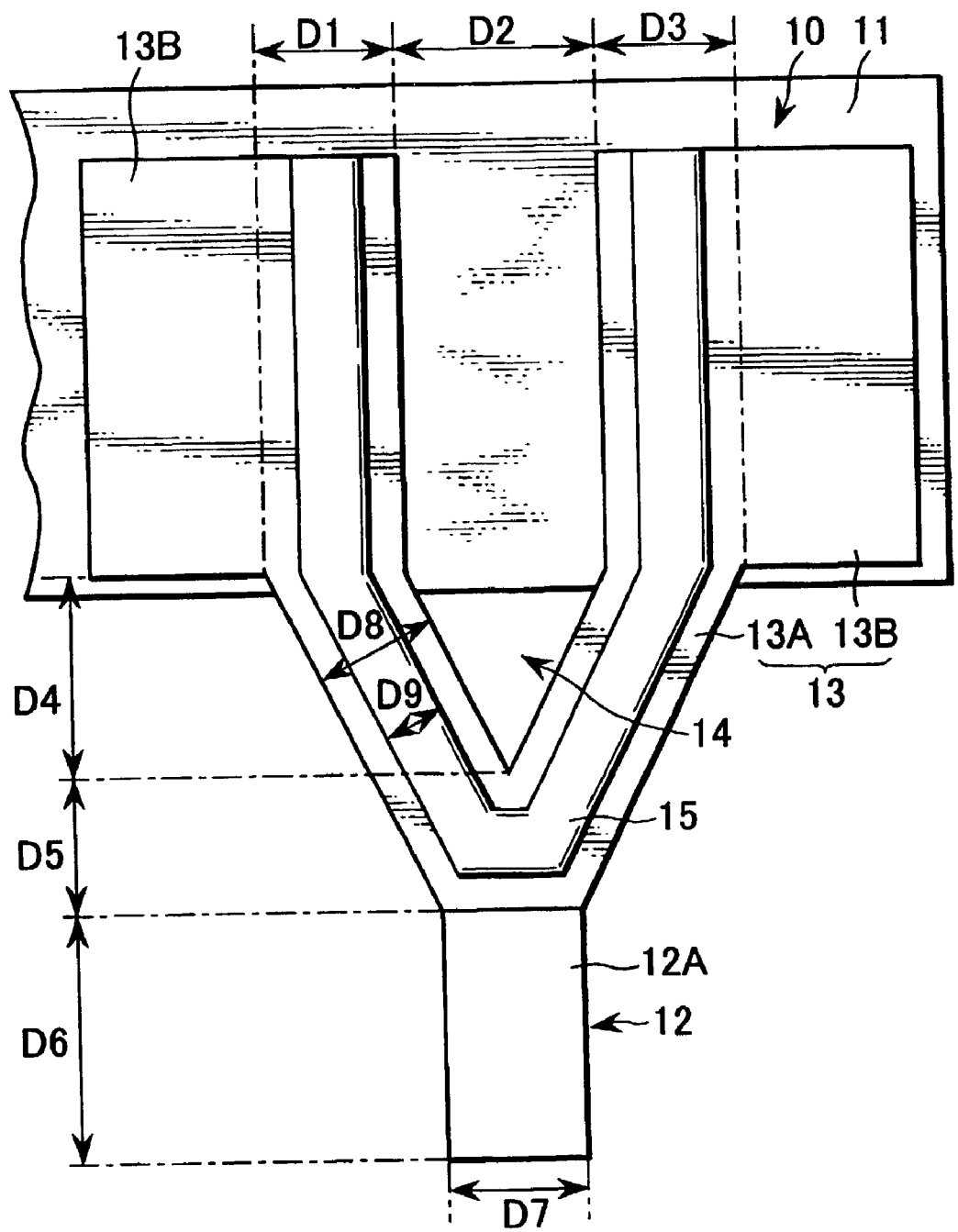
FIG. 2 is a top view for explaining a structure of the micro-mirror in FIG. 1.
Figure 3:
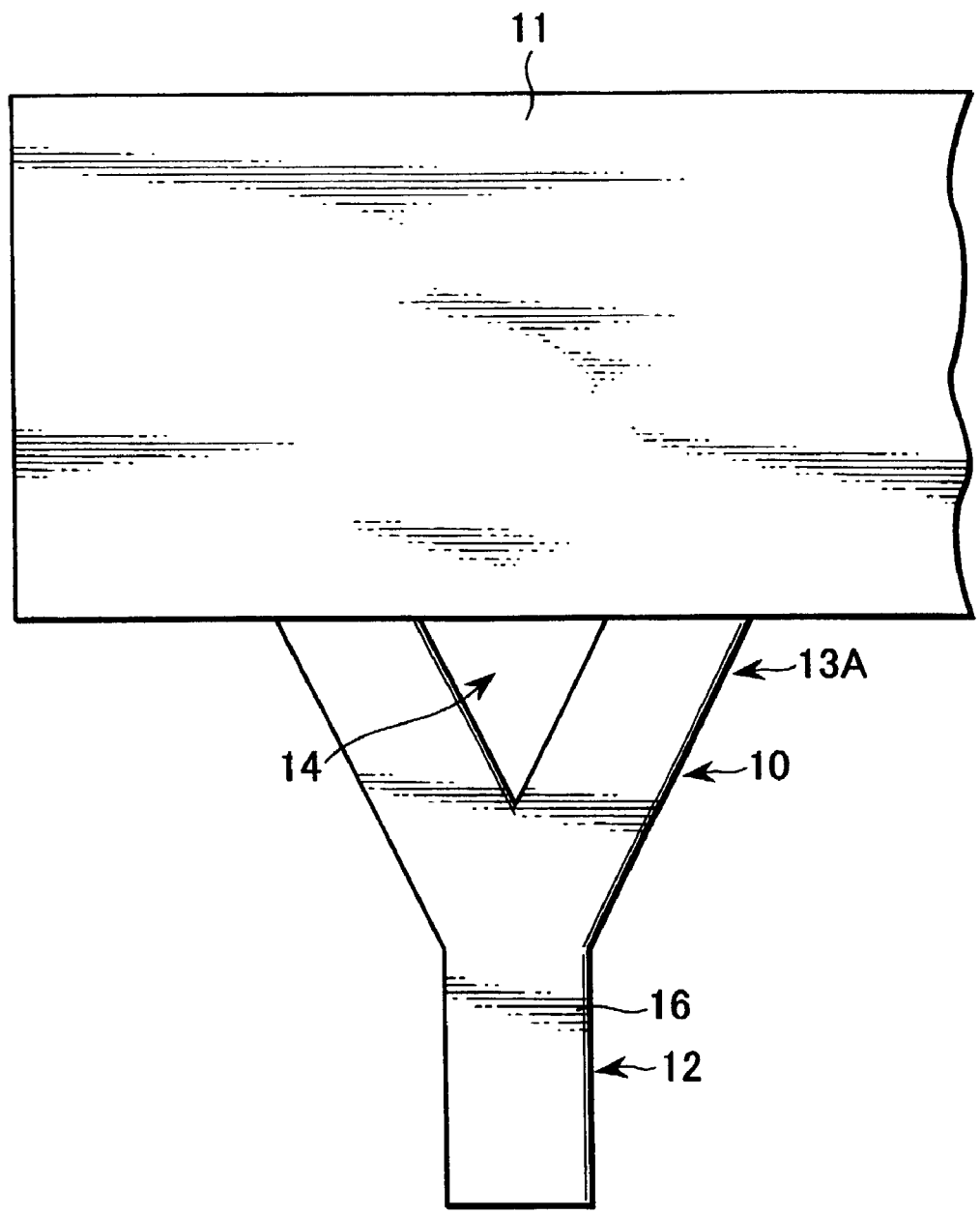
FIG. 3 is a bottom view for explaining the structure of the micro-mirror in FIG.

FIG. 2 is a top view of the micro-mirror 10 in FIG. 1, and FIG. 3 is a bottom view thereof. As shown in FIG. 2, a poly-silicon film 15 including an impurity such as phosphor (P), for example, is formed on a front surface from the moving section 13A to the fixed section 13B of the hinge section 13. On the contrary, as shown in FIG. 3, an aluminum film 16 is entirely formed on a back surface of the moving section 13A of the hinge section 13. Thereby the poly-crystal silicon film 15 and the aluminum film 16 are formed to be a bi-morph structure while sandwiching the hinge section 13 made of the silicon nitride. In this case, although not shown, an electrode pad (FIG. 7A) for supplying current to the poly-crystal silicon film 15 is provided on the fixed section 13B of the hinge section 13.

In this micro-mirror 10, the laser light irradiated from the laser diode 3 becomes outgoing laser light R1 by being reflected at the mirror section 12 after passing through the micro-lens 4 as shown in an initial state designated in FIG. 4 by a real line. The outgoing laser right R1 is scattered upon scanning the target, and its return light R2 is detected by the photo diode 5.

Further when current is supplied the poly-crystal silicon film 15, the hinge section 13 is heated by Joule heat of the poly-crystal silicon, and as a result, both the poly-crystal silicon film 15 and the aluminum film 16 are thermally expanded. In this case, the thermal expansion coefficient of the aluminum is about nine times larger than the thermal expansion coefficient of the poly-crystal silicon, and accordingly the movable section 13A of the hinge section 13 bends to a direction indicated by an arrow A as shown in FIG. 4 with dotted line around a boundary section of the fixed section 13B and the movable section 13A of the hinge section as a center, namely to a direction perpendicular to the flat surface (100) of the silicon substrate 11 (upwards).

Generally it is well known that a deflection speed of a bi-morph structure of a micron order in size is possible to be up to several kHz, and accordingly, a high-speed deflection of the hinge section 13 can be expected. Responding to the deflection of the hinge section 13, the mirror section 12 rotates around the boundary of the hinge section 13 as a center. In this case, the laser light issued from the laser diode 3 is reflected at the mirror section 12 and becomes an outgoing light R3. As the mirror section 12 has a large angle such as 55 degrees, so that the mirror section 12 at the tip can obtain larger deflection angle.

As described above, by thermally driving the micro-mirror 19 having the bi-morph structure, the laser light issued from the laser diode 3 is continuously switched to two directions such as the outgoing light R1 at a halt mode and the outgoing light R3 at a drive mode, and is able to irradiate onto the bar-code 20 to scan. Further the hinge section 13 having the flat shape deflects around the boundary section of fixed section 13B and the movable section 3A as a center in a direction of the arrow A, thereby deflects in a direction perpendicular to the flat surface (100) of the silicon substrate 11, then such deflection is transmitted to the mirror section 12 of the free end. Accordingly different from the conventional structure, the structure is so constructed that the gravity itself of the mirror section 12 moves, and therefore the mirror section 12 can move more widely in the deflection angle.

Further, in this embodiment, as performing a high speed deflection of the hinge section 13 having a bi-morph structure and forming the mirror section 12 as to have a large angle of 55 degrees relative to the hinge section 13, it becomes possible to deflect the laser light with relatively high speed at the mirror section 12, so that it becomes possible to make larger the deflection angle.

FIG. 5 to FIG. 8 show a series of fabrication process of the micro-mirror of the present invention. In this method, a silicon nitride film (SiNx) is formed as a structured film on the silicon substrate 11 which has the slant surface (111) formed by an-isotropic etching, and after that the mirror section 12 and the hinge section 13 are formed by etching in order to remove the silicon substrate 11.

Figure 5A:
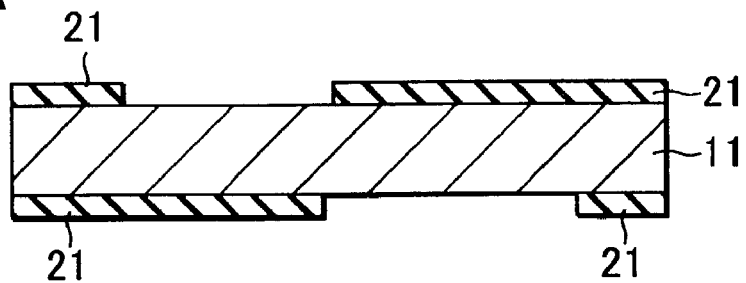
FIGS. 5A to 5D are sectional views for showing one embodiment of a method for fabricating the micro-mirror in fabrication steps.

As shown in FIG. 5A, at first an n-type silicon substrate 11 of 200 $\mu$m in thickness is prepared. A thermal oxide film of 300 $\mu$m in thickness, for example, is formed on both surfaces of the silicon substrate 11, then the thermal oxide film is performed a patterning by etching using photo lithography and hydrogen fluorides (HF). Thus the thermal oxide film mask 21 for silicon wet an-isotropic etching is formed.

Figure 5B:
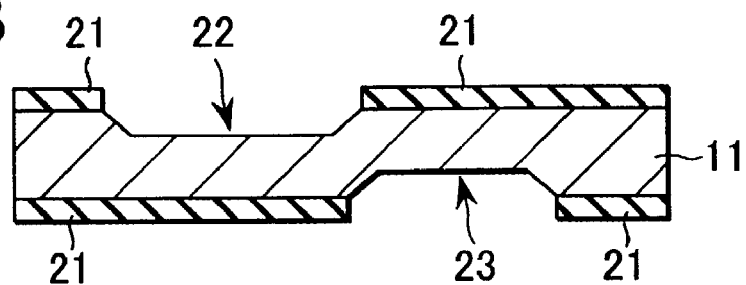

And, the wet an-isotropic etching by TMAH (Tetra-Methyl Ammonium Hydroxide) is performed using the thermal oxide film mask 21. In this case, the etching rate is 0.5 $\mu$m/min., for example. Thereby, grooves 22, 23 are formed as shown in FIG. 5B. The groove 22 is 400 $\mu$m in width (mask size), 300 $\mu$m in length and 60 $\mu$m in depth, and the groove 23 is 300 $\mu$m in width, 300 $\mu$m in length and 60 $\mu$m in depth.

Figure 5C:
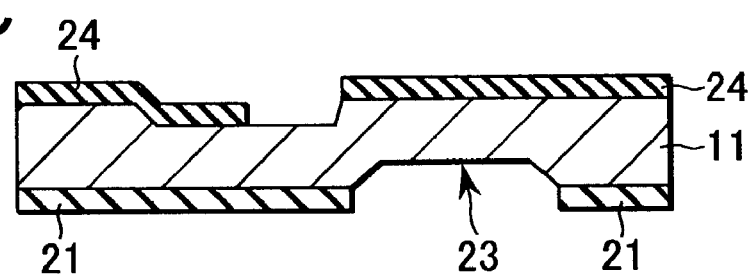

Next, the thermal oxide film mask 21 on the back surface of the silicon substrate 11 is protected by a photo-resist (not shown) and only the thermal oxide film mask 21 on the front surface of the silicon substrate 11 is removed. After that, a thermal oxide film of 300 nm in thickness is again formed on the front surface of the silicon substrate 11, thereby a thermal oxide film mask 24 is formed by patterning thus formed thermal oxide film for second wet an-isotropic etching as shown in FIG. 5C.

The patterning of the thermal oxide film mask 24 is performed by forming a photo-resist film (not known) having even thickness by spray method using a resist spray apparatus and exposing by an UV (Ultra Violet) ray irradiation with deep focal depth using a projection exposure apparatus. In this case, as the thermal oxide film mask 21 on the back surface of the silicon substrate 11 is protected by the photo-resist (not shown), a pattern of the thermal oxide film mask 21 on the back surface of the silicon substrate 11 is the same.

Figure 5D:
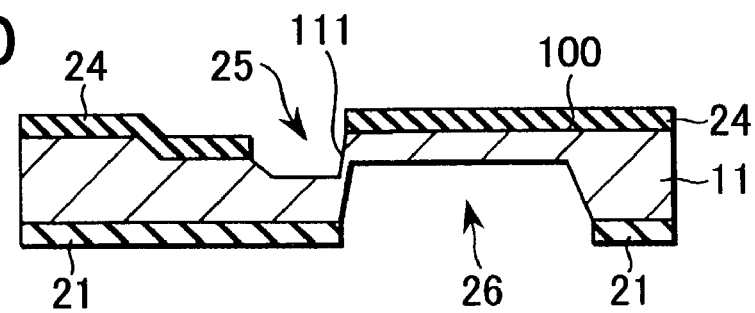

After that, as shown in FIG. 5D, the silicon substrate 11 is further etched by 60 $\mu$m by performing a wet an-isotropic etching by TMAH, for example, using the thermal oxide film masks 21, 24. Thus grooves 25, 26 of 120 $\mu$m in depth are formed. Thereby, the slant surface (111) for forming the mirror section 12 and the flat surface (100) for forming the hinge section 13 are formed. A width (mask size) of the groove 25 is 50 $\mu$m, for example, and a width of the groove 26 is as same as that of the groove 23.

Figure 6A:
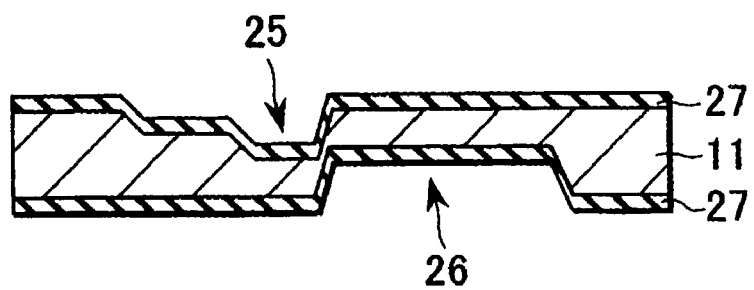
FIGS. 6A to 6C are sectional views for explaining the fabrication steps following the fabrication steps in FIGS. 5A to 5D.

Next, as shown in FIG. 6A, the thermal oxide films 21, 24 on both surfaces of the silicon substrate 11 are removed, and then silicon nitride films (SiNx) 27 of 200 nm in thickness are formed on both surfaces of the silicon substrate 11 by a low-pressure CVD (Chemical Vapor Deposition) method.

Figure 6B:
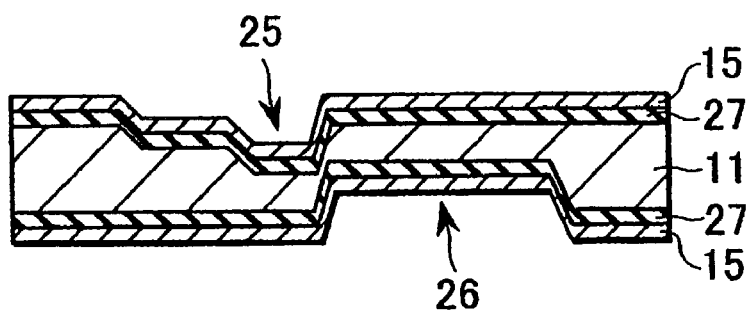

Then as shown in FIG. 6B, a phosphor (P) doped poly-crystal silicon film 15 of 500 nm in thickness is formed on both surfaces of the silicon substrate 11 by the low-pressure CVD (Chemical Vapor Deposition) method.

Figure 6C:
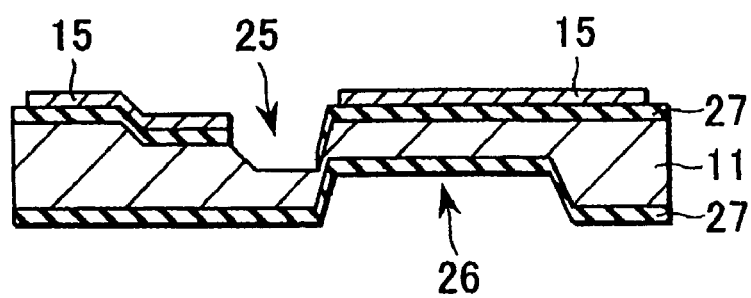

Further after spraying photo-resist by a resist spray apparatus, a photo-resist pattern is formed by a projection exposure apparatus, and then performs patterning of the poly-crystal silicon film 15, as shown in FIG. 6C, by etching using SF6 (Sulfur Hexa-Fluoride) gas with the photo-resist pattern as a mask. Thus the poly-crystal silicon film 15 is formed to be a shape as shown in FIG. 1 or FIG. 2. In this case, the poly-crystal silicon film 15 on the back surface of the silicon substrate 11 is similarly removed by dry etching using SF6 gas.

Again, a photo-resist pattern (not shown) is formed by patterning using the projection exposure apparatus after spraying photo-resist by the resist spray apparatus, then the silicon nitride film 27 is performed the patterning as shown in FIG. 6C, using the photo-resist pattern as a mask, by dry-etching using CF4 (Carbon Tetra-Fluoride) gas. Thus, the silicon substrate 11 is exposed at a part of the groove 25.

Figure 7A:
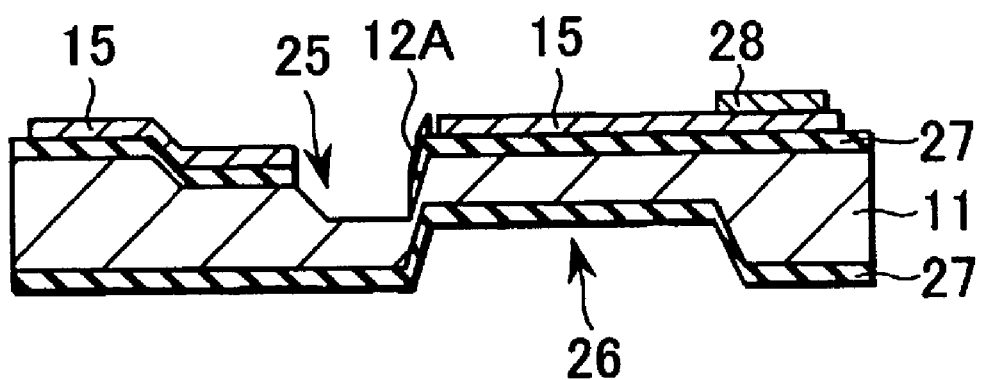
FIGS. 7A and 7B are sectional views for explaining the fabrication steps following the fabrication steps in FIGS. 6A to 6C.

After that, an aluminum film of 200 nm in thickness is formed, for example, by sputtering method. Further, a photo-resist pattern (not shown) is formed by patterning with the projection exposure apparatus after photo-resist is sprayed by the resist spray apparatus, and then the aluminum film is patterned by the etching using phosphoric acid with thus formed photo-resist pattern as a mask. Thus as shown in FIG. 7A, the reflection film 12A of the mirror section 12 and the electrode pad 28 for connecting to the poly-crystal silicon film 15.

Figure 7B:
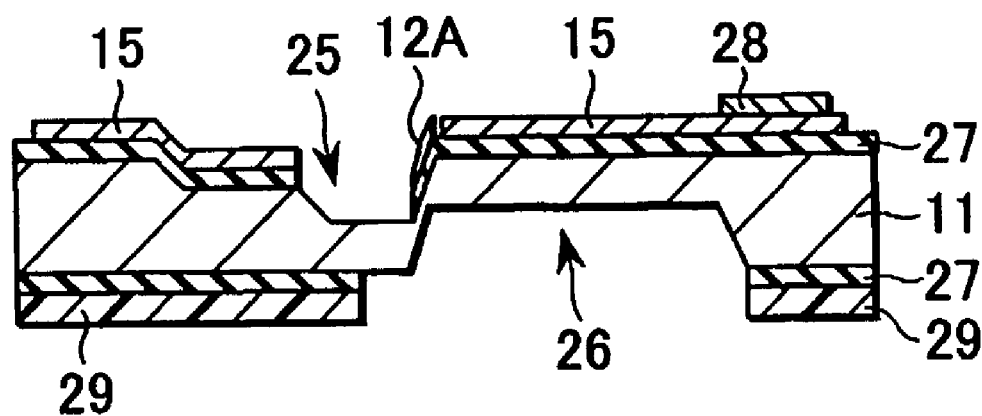

Next as shown in FIG. 7B, a photo-resist pattern 29 is formed by patterning with the projection exposure apparatus after spaying photo-resist by the resist spray apparatus, then the nitride silicon film 27 is patterned by etching using the photo-resist pattern 29. Thus the silicon substrate 11 is exposed at the groove 25 and the periphery thereof. In this case, the front surface of the silicon substrate 11 is protected by the photo-resist.

Figure 8A:
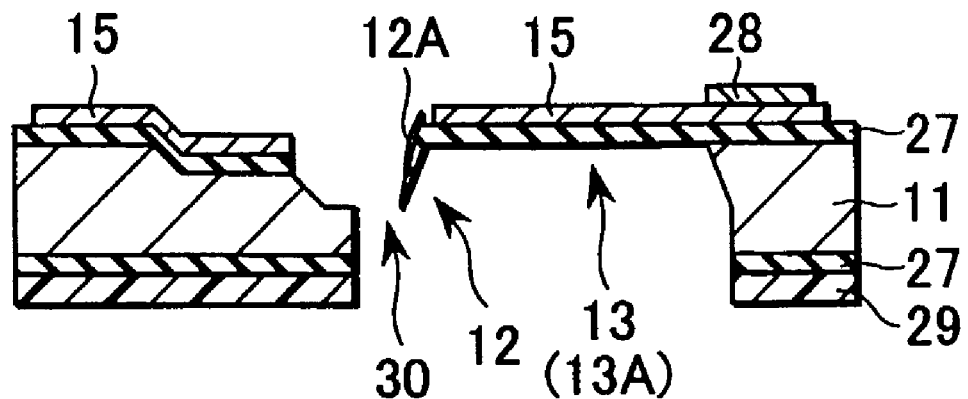
FIGS. 8A and 8B are sectional views for explaining the fabrication steps following the fabrication steps in FIGS. 7A to 7B.

And, as shown in FIG. 8A, by a deep RIE (Reactive Ion Etching) method performing silicon etching while generating high-density plasma by switching C4F8 (Octafluorocyclobutane) gas and SF6 gas, a through hole 30 is formed by etching the back surface of the silicon substrate 11 at a bottom section of the groove 25 and further the silicon substrate 11 around the groove 26. Thus, the mirror section 12 made of the silicon nitride film 27 is cut off to be a free end and the movable section 13A of the hinge section 13 made of the silicon nitride film 27 is formed.

Figure 8B:
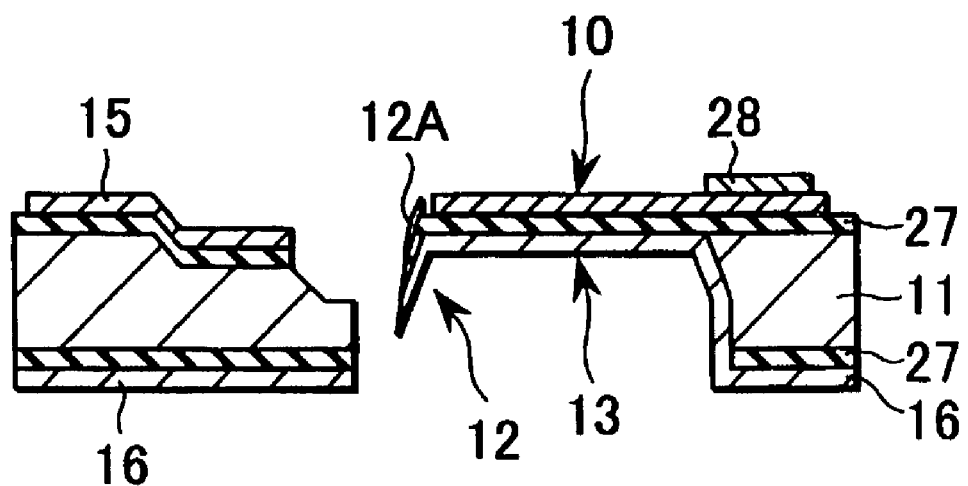

Lastly, as shown in FIG. 8B, after the photo-resist pattern 29 is removed, and an aluminum film 16 of 700 nm in thickness is formed on entire back surface of the silicon substrate 11 by sputtering method, for example. Thus the micro-mirror 10 of the present invention is completed.

In the micro-mirror 10 thus fabricated by this fabrication method, the nitride silicon film 27 formed by the low-pressure CVD method, for example, is utilized as materials for the mirror section 12 and the hinge section 13, so that it is extremely tough to repeating vibration without any stress such as normal metal material. As the thickness of the nitride silicon film 27 can be precisely controllable, the micromirror 10 having extremely preferable reproducibility in vibration characteristics can be fabricated. The mirror section 12 has the reflection film 12A having a mirror surface formed by aluminum deposition, so that a reflection coefficient is high. Further, the mirror section 12 form large angle such as 55 degrees relative to the fixed section 13B of the hinge section 13, so that the mirror section 12 can deflect more widely.

One example of the micro-mirror 10 fabricated by the fabrication method as explained above is described next.

The completed micro-mirror 10 has a symmetric form in left and right and its size of D1, D2 and D3 in FIG. 2 are 80 $\mu$m, 120 $\mu$m and 80 $\mu$m, respectively. Further its size of D4, D5, D6 and D7 in FIG. 2 are 120 $\mu$m, 80 $\mu$m, 140 $\mu$m and 80 $\mu$m, respectively. In addition in FIG. 2, its size of D8 and D9 are 70 $\mu$m and 40 $\mu$m, respectively. In this micro-mirror 10, when the vibration characteristics were measured by flowing pulse current to the poly-silicon film 15, the maximum deflection angle was 25 degrees and the maximum deflection speed was 3 kHz.

As described above, one embodiment of the present invention is explained with reference to accompanying drawings, but this invention is not limited to this embodiment, and various modified forms are possible. For example, sizes of each section, materials of the substrate, thickness of film and process conditions are freely modified without exceeding the purpose of the present invention. For example, any of Potassium Hydroxide (KOH), Hydrazine, Ethylene-Diamine-Pyrocatechol Water (EPW) is usable instead of the TMAH.

Figure 9:
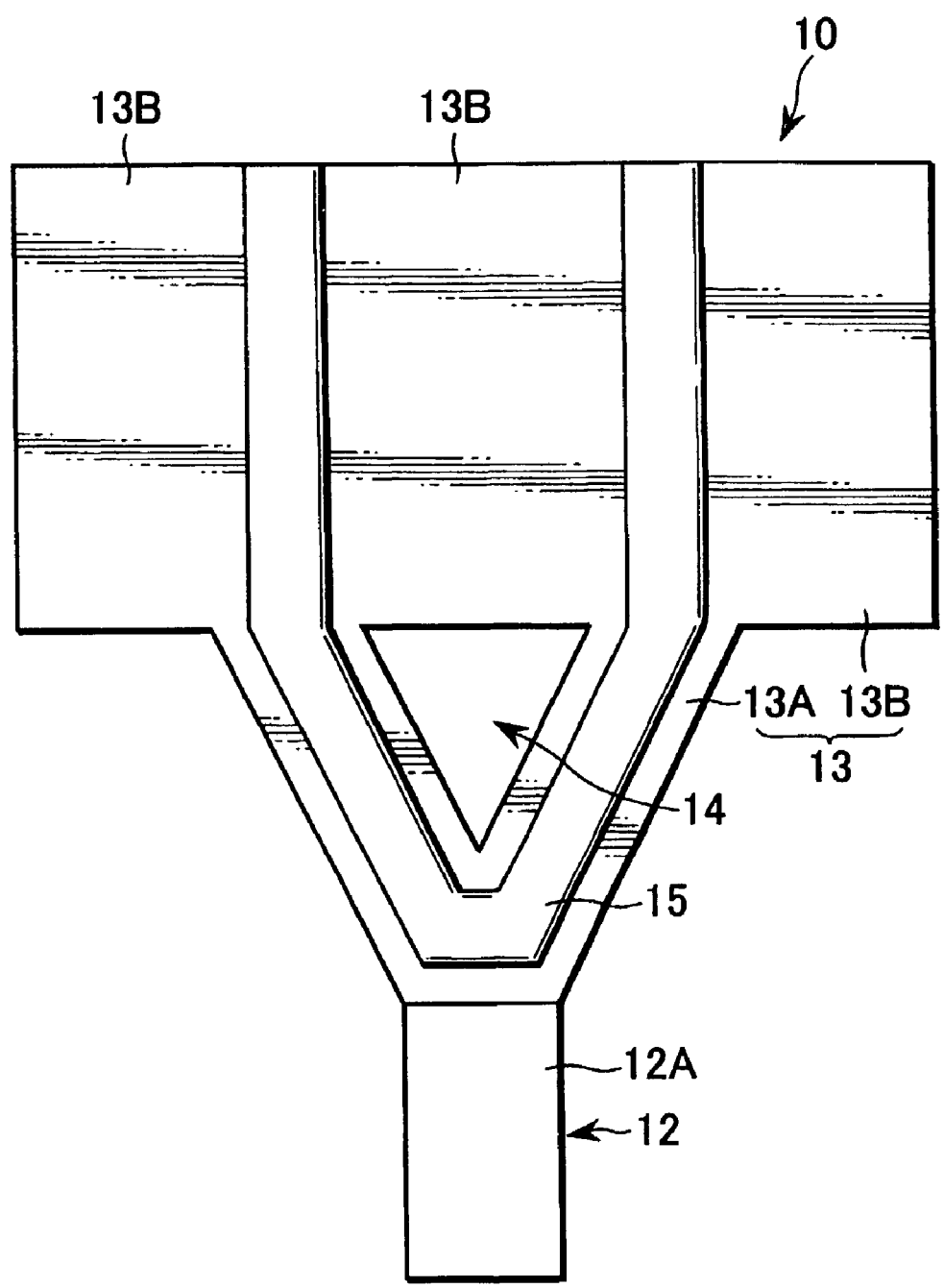
FIG. 9 is a top view for showing another embodiment of a structure of the micro-mirror in FIG. 1.

In the above described embodiment, the micro-mirror 10 has one aperture and two hinge sections, but it is possible to align a plurality of apertures in neighbor and to provide three or more than three hinge sections. Further in the above mentioned embodiment, the fixed section of the hinge section is formed into two sections, but these are formed in integrated form as shown in FIG. 9.

Further in the above mentioned embodiment, the ply-crystal silicon film and the aluminum film are formed at the hinge section made of silicon nitride as the bi-morph structure, but it is possible to use other film material such as a combination of poly-crystal silicon and Titanium (Ti) film. Further, it is possible to construct the bi-morph structure by positioning the poly-crystal silicon films that comprises same type material but having different conductivity and having different sectional areas as wiring on both surfaces of the hinge section. In this case, the heat value differs owing to the difference of the conductivity, namely resistance and as a result, the rates of thermal expansion are different to each other, so that similar deflection can be obtained as if the bi-morph structure using different materials is employed.

In addition, the laser scanner is explained as one example of the semiconductor device in the above-described embodiment, but this invention can apply to a method for fabricating other semiconductor devices such as a sensor in the MEMS field and a DMD (Digital Micro-mirror Device).

What is claimed is:

1. A method for fabricating the micro-mirror which comprises:

a mirror section for reflecting an incident light;

a hinge section including a fixed section and a movable section each having a flat surface;

a drive means having a bi-morph structure made of two or more materials having different heat expansion coefficient for deflecting said mirror section of a relative angle to said incident light; wherein said hinge section and the mirror section are integrally constructed by a structured film formed on a semiconductor substrate by utilizing crystal anisotropy of said semiconductor substrate;

said movable section of the hinge section is formed as to be continuous from said fixed section of the hinge section and is formed so as to construct a bent slanting surface at an extended section of the fixed section of the hinge section;

comprising the steps of:

forming a first groove having a first skewed surface at a side wall on a front surface of said semiconductor substrate, and a second groove having a second skewed surface substantially parallel to said first skewed surface of the first groove at a position and opposite to a flat surface section around said first groove on a back surface of said semiconductor substrate;

forming structure films at said first skewed surface of the first groove and said flat surface section around said first groove;

forming a first drive film at one surface of said structured film;

forming said mirror section and said hinge section made of the structured film by removing said semiconductor substrate with etching process after performing a through-hole etching of said semiconductor substrate to make one end of said structured film to be a free end at a bottom section of said first groove;

forming a second drive film on another surface of the structured film constructing said hinge section;

forming a metal film on said structured film constructing said mirror section and the hinge section; and forming a reflection film and an electrode pad for supplying current to said reflection film by selectively etching said metal film.

2. The method for fabricating the micro-mirror of claim 1, wherein a patterned photo-resist obtained by patterning the photo-resist film uniformly formed in thickness by the spray method by projection exposure apparatus is used as a mask upon forming said reflection mirror and the electrode pad.

* * * * *